US012105214B2

(12) United States Patent
Garcia et al.

(10) Patent No.: US 12,105,214 B2
(45) Date of Patent: Oct. 1, 2024

(54) POSITION VALIDATION (71) Applicant: AIREON LLC, McLean, VA (US)

(72) Inventors: Michael A. Garcia, Ashburn, VA (US); John Dolan, Chantilly, VA (US)

(73) Assignee: AIREON LLC, McLean, VA (US)

(*) Notice: Subject to any disclaimer, the term of this patent is extended or adjusted under 35 U.S.C. 154(b) by 473 days.

(21) Appl. No.: 16/937,890

(22) Filed: Jul. 24, 2020

(65) Prior Publication Data

US 2020/0355832 A1 Nov. 12, 2020

Related U.S. Application Data

(63) Continuation of application No. 15/403,398, filed on Jan. 11, 2017, now Pat. No. 10,901,093.

(51) Int. Cl.
*G01S 5/02* (2010.01)
*G01S 5/06* (2006.01)
*G01S 5/12* (2006.01)
*G01S 19/03* (2010.01)
*G01S 19/21* (2010.01)
*H04K 3/00* (2006.01)

(52) U.S. Cl.
CPC ............. *G01S 5/0244* (2020.05); *G01S 5/06* (2013.01); *G01S 5/12* (2013.01); *H04K 3/90* (2013.01); *G01S 19/03* (2013.01); *G01S 19/215* (2013.01)

(58) Field of Classification Search
CPC .................................................. G08G 5/0013
USPC ......................................... 342/41, 353, 357.4
See application file for complete search history.

(56) References Cited

U.S. PATENT DOCUMENTS

| 3,430,234 A |   | 2/1969 | Wright |                |
|---|---|---|---|---|
| 5,008,679 A | * | 4/1991 | Effland | G01S 5/06 342/353 |
| 7,375,683 B2 | * | 5/2008 | Smith | G01S 19/07 342/387 |
| 7,570,214 B2 | * | 8/2009 | Smith | G01S 5/0027 342/451 |

(Continued)

OTHER PUBLICATIONS

Delovski, et al. "ADS-B over Satellite The world's first ADS-B receiver in Space." Small Satellites Systems and Services Symposium. May 2014. pp. 1-17. (Year: 2014).*

(Continued)

*Primary Examiner* — Bo Fan
(74) *Attorney, Agent, or Firm* — Baker Botts L.L.P.

(57) ABSTRACT

In one implementation, a method includes receiving versions of a message from a first satellite-based receiver and a second satellite-based receiver that both received a radio frequency ("RF") transmission of the message, the message comprising a self-reported position of a transmitter of the message. The method also includes determining a time difference between a first arrival time of the RF transmission of the message at the first satellite-based receiver and a second arrival time of the RF transmission of the message at the second satellite-based receiver. The method further includes determining a measure of the likelihood that the self-reported position of the transmitter is valid based on the time difference between the first and second arrival times. The method still further includes transmitting an indication of the measure of the likelihood that the self-reported position is valid.

20 Claims, 7 Drawing Sheets

(56) References Cited

U.S. PATENT DOCUMENTS

| | | | | |
|---|---|---|---|---|
| 7,777,675 | B2* | 8/2010 | Smith | G01S 5/0221 |
| | | | | 342/463 |
| 7,809,370 | B2* | 10/2010 | Stolte | H04B 7/18513 |
| | | | | 455/427 |
| 8,610,619 | B2* | 12/2013 | Andersson | G08G 5/0021 |
| | | | | 342/36 |
| 9,052,375 | B2* | 6/2015 | Sampigethaya | G01S 1/30 |
| 2007/0252760 | A1 | 11/2007 | Smith et al. | |
| 2010/0128656 | A1 | 5/2010 | Kim et al. | |
| 2011/0140950 | A1* | 6/2011 | Andersson | G01S 5/0072 |
| | | | | 342/41 |
| 2011/0163908 | A1 | 7/2011 | Anderson et al. | |
| 2012/0041620 | A1 | 2/2012 | Slayton et al. | |
| 2013/0275842 | A1* | 10/2013 | Peach | G06F 11/0751 |
| | | | | 714/799 |
| 2014/0070979 | A1 | 3/2014 | Andersson et al. | |
| 2014/0145877 | A1 | 5/2014 | Arcidiacono et al. | |
| 2014/0327581 | A1* | 11/2014 | Murphy | G01S 3/043 |
| | | | | 342/417 |
| 2017/0102466 | A1* | 4/2017 | Petkus | G01S 5/0249 |

OTHER PUBLICATIONS

P. Noschese, et al. "ADS-B via Iridium NEXT satellites," 2011 Tyrrhenian International Workshop on Digital Communications - Enhanced Surveillance of Aircraft and Vehicles, Capri, 2011, pp. 213-218. (Year: 2011).*

European Patent Office, Search Report for International Application No. PCT/2018/013110, mailed Apr. 24, 2018.

European Patent Office, International Searching Authority, Search Report and Written Opinion for International Application No. PCT/2018/013110, mailed Jun. 18, 2018.

David Munoz et al., "Position Location Techniques and Applications", pp. 33-56.

Delovski et al., "ADS-B over Satellite The World's first ADS-B Receiver in Space", Small Satellites Systems and Services Symposium, May 2014, pp. 1-17, 2014.

P. Noschese et al., "ADS-B via Iridium NEXT Satellites", 2011 Tyrrhenian International Workshop on Digital Communications-Enhanced Surveillance of Aircraft and Vehicles, Capri, pp. 213-218, 2011.

W. Li et al., "3D AOA/TDOA Emitter Location by Integrated Passive Radar/GPS/INS Systems", IEEE Int. Workshop VLSI Design and Video Tech. Suzhou, China, May 28-30, pp. 1-4, 2005.

European Patent Office, Office Action issued in European Patent Application No. EP 18 702 000.3, dated Aug. 21, 2020.

European Patent Office, Notice of Allowance issued in European Patent Application No. 18 702 000.3, mailed Jul. 15, 2022 (36 pages).

European Patent Office, Extended European Search Report issued in European Patent Application No. 22209242.1, mailed Mar. 1, 2023 (8 pages).

* cited by examiner

| PARAMETER | EXAMPLE SCORE WEIGHT | EXAMPLE TIME TO LIVE (s) |
|---|---|---|
| DOA VALIDATION | 5 | 600 |
| BEAM VALIDATION | 1 | 2 |

FIG. 5A $$\text{Total\_Validation\_Percentage} = \frac{\sum_{i=1}^{N} v_i \cdot \omega_i}{\sum_{i=1}^{N} \omega_i}$$

- Where N is the number of scores with an active validity time, v is the validation state for score i (either 1 for valid or 0 for invalid), and ω is the weight of score i (based on the table above)

POSITION VALIDATION

RELATED APPLICATIONS

This application is a Continuation of U.S. patent application Ser. No. 15/403,398, filed Jan. 11, 2017, the entire content of which is incorporated herein by reference.

TECHNICAL FIELD

The disclosure relates generally to position validation.

SUMMARY

According to one implementation of the disclosure, a method includes receiving versions of a message from a first satellite-based receiver and a second satellite-based receiver that both received a radio frequency ("RF") transmission of the message, the message comprising a self-reported position of a transmitter of the message. The method also includes determining a time difference between a first arrival time of the RF transmission of the message at the first satellite-based receiver and a second arrival time of the RF transmission of the message at the second satellite-based receiver. The method further includes determining a measure of the likelihood that the self-reported position of the transmitter is valid based on the time difference between the first and second arrival times. The method still further includes transmitting an indication of the measure of the likelihood that the self-reported position is valid.

Other features of the present disclosure will be apparent in view of the following detailed description of the disclosure and the accompanying drawings. Implementations described herein, including the above-described implementations, may include a method or process, a system, or computer-readable program code embodied on computer-readable media

BRIEF DESCRIPTION OF THE DRAWINGS

For a more complete understanding of the present disclosure, reference now is made to the following description taken in connection with the accompanying drawings.

DETAILED DESCRIPTION

Historically, aircraft surveillance and flight path management services have utilized ground-based radar stations and other terrestrial surveillance data processing systems. For example, such systems have employed primary surveillance radar (PSR), secondary surveillance radar (SSR), and/or Mode-S radar for communicating flight position and monitoring information to local ground stations, which then may relay received flight position and monitoring information to regional or global aircraft monitoring systems. Recently, automatic dependent surveillance-broadcast ("ADS-B") has gained attention as a potential replacement for conventional radar technology in modern flight surveillance systems. In such systems, an aircraft-borne transmitter may transmit occasional (e.g., periodic) messages that include flight position and other related information, for example, in some implementations, via Extended Squitter messages over 1090 MHz Mode-S (i.e., 1090ES). Such ADS-B messages from the aircraft-borne transmitter then may be received by receiving infrastructure and transmitted to air traffic control or other aircraft surveillance and flight path management systems.

As such, ADS-B aircraft surveillance relies on information that is self-reported by the aircraft themselves to track and manage the aircraft. Such self-reported ADS-B information may include position information such as altitude, latitude, longitude, etc., travel vector data, and other aircraft and/or flight status information. Because ADS-B aircraft surveillance relies on self-reported information, ADS-B aircraft surveillance systems may be susceptible to errors in the self-reported information. For example, ASD-B aircraft surveillance systems may be susceptible to self-reported information that is intentionally false, for instance, when malfeasors spoof ADS-B transmissions by intentionally broadcasting false self-reported information. Additionally or alternatively, ADS-B aircraft surveillance systems may be susceptible to errors caused by malfunctioning avionics on board the aircraft being tracked, for example, when avionics on board the aircraft miscalculate the aircrafts' positions. In order to mitigate negative impacts that may be caused by the presence of errant, self-reported information in ADS-B aircraft surveillance systems, it may be helpful to validate the accuracy of the position information self-reported by the aircraft.

In certain implementations, ground- or satellite-based ADS-B receivers can use techniques described in the present disclosure to estimate the position of an aircraft when two or more ADS-B receivers receive the same ADS-B message broadcast by the aircraft. For example, ADS-B receivers may have overlapping coverage areas. Thus, when an aircraft-borne transmitter is located within a region that is within the coverage area of multiple ADS-B receivers, multiple ADS-B receivers may receive ADS-B messages broadcast by the aircraft-borne transmitter.

In some implementations, satellites in a satellite constellation are equipped with ADS-B receivers for receiving ADS-B messages broadcast by aircraft. For example, in some particular implementations, each satellite in a low-Earth orbit (LEO) (e.g., orbits having altitudes of ~99-1200 miles) constellation of satellites having 6 planes of 11 satellites in substantially polar orbits may be equipped with an ADS-B receiver such that, collectively, the ADS-B receivers on board the satellites provide global or substantially global ADS-B coverage. In such implementations, the satellites may be connected by inter-satellite crosslinks that effectively create a wireless mesh network in space through which individual satellites of the constellation can communicate with one another and/or with terrestrial infrastructure like earth terminals and the like. As such, ADS-B messages received by the receivers on board the satellites may be communicated through the satellite network to terrestrial communications infrastructure for to, for example, an aircraft surveillance system, such as one provided for air traffic control.

When multiple satellite-based receivers receive the same ADS-B message broadcast by an aircraft (e.g., because the coverage areas of the satellite-based receivers overlap and include the aircraft), techniques described in the present disclosure may be used to validate the position information self-reported by the aircraft in the ADS-B message received by the satellite-based receivers.

Figure 1:
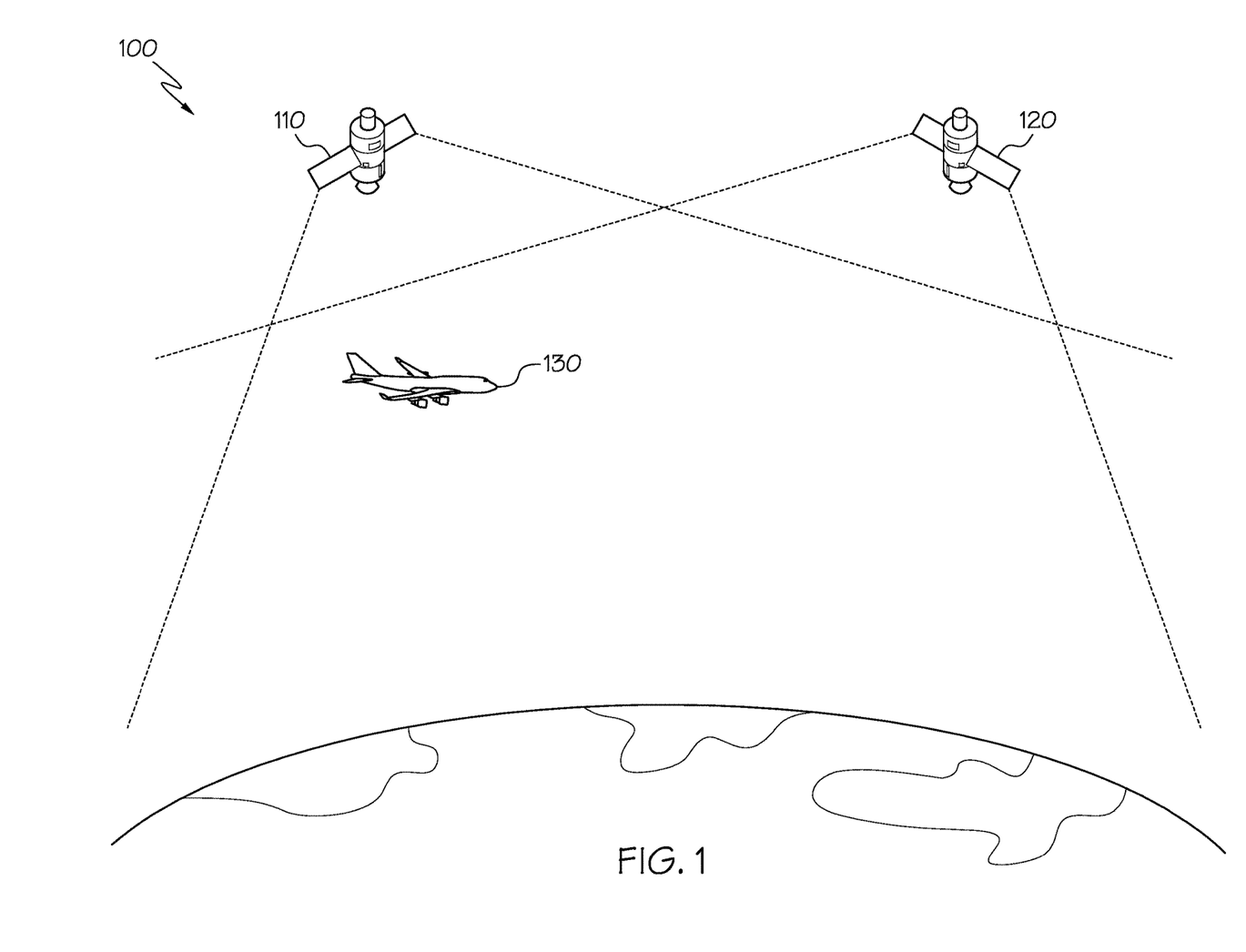
FIG. 1 is a block diagram of a portion of an example of a system for self-reported position validation using space-based receivers in accordance with a non-limiting implementation of the present disclosure.

With reference to FIG. 1, a portion of an example of a system 100 for validating self-reported position information in ADS-B messages self-reported position validation using space-based ADS-B receivers is illustrated. In particular, aircraft 130 transmits an ADS-B message (e.g., as a radio-frequency (RF) signal) using an on-board ADS-B transmitter. Among other information, the ADS-B message may include position, status, an aircraft and/or flight identifier, and other flight information compiled by the avionics of aircraft 130. A satellite constellation having multiple satellites (e.g., satellites 110 and 120) equipped with ADS-B receivers may be configured such that the coverage areas of individual satellites overlap. For example, as illustrated in FIG. 1, satellite 110 coverage area 112 and satellite 120 coverage area 122 overlap in at least the region where aircraft 130 currently is located. Accordingly, both satellites 110 and 120 may receive the ADS-B message transmitted by aircraft 130.

In certain implementations, the current position of aircraft 130 may be estimated based on the time difference of arrival (TDOA) of the ASD-B message at the receivers on satellites 110 and 120. For example, as described in greater detail below, a hyperboloid may be generated based on the TDOA of the ADS-B message at the receivers on satellites 110 and 120 that defines potential positions of aircraft 130. In some cases, a validation distance for the position of the aircraft can be calculated by determining the distance between the position of the aircraft 130 as reported in the ADS-B message and the closest point on the hyperboloid to the self-reported position of the aircraft 130. In such cases, if the validation distance is less than or equal to some defined threshold, the self-reported position of the aircraft 130 included in the ADS-B message may be determined to be valid. Alternatively, if the validation distance is greater than the defined threshold, the self-reported position of the aircraft 130 included in the ADS-B message may be determined to be invalid.

Figure 3A:
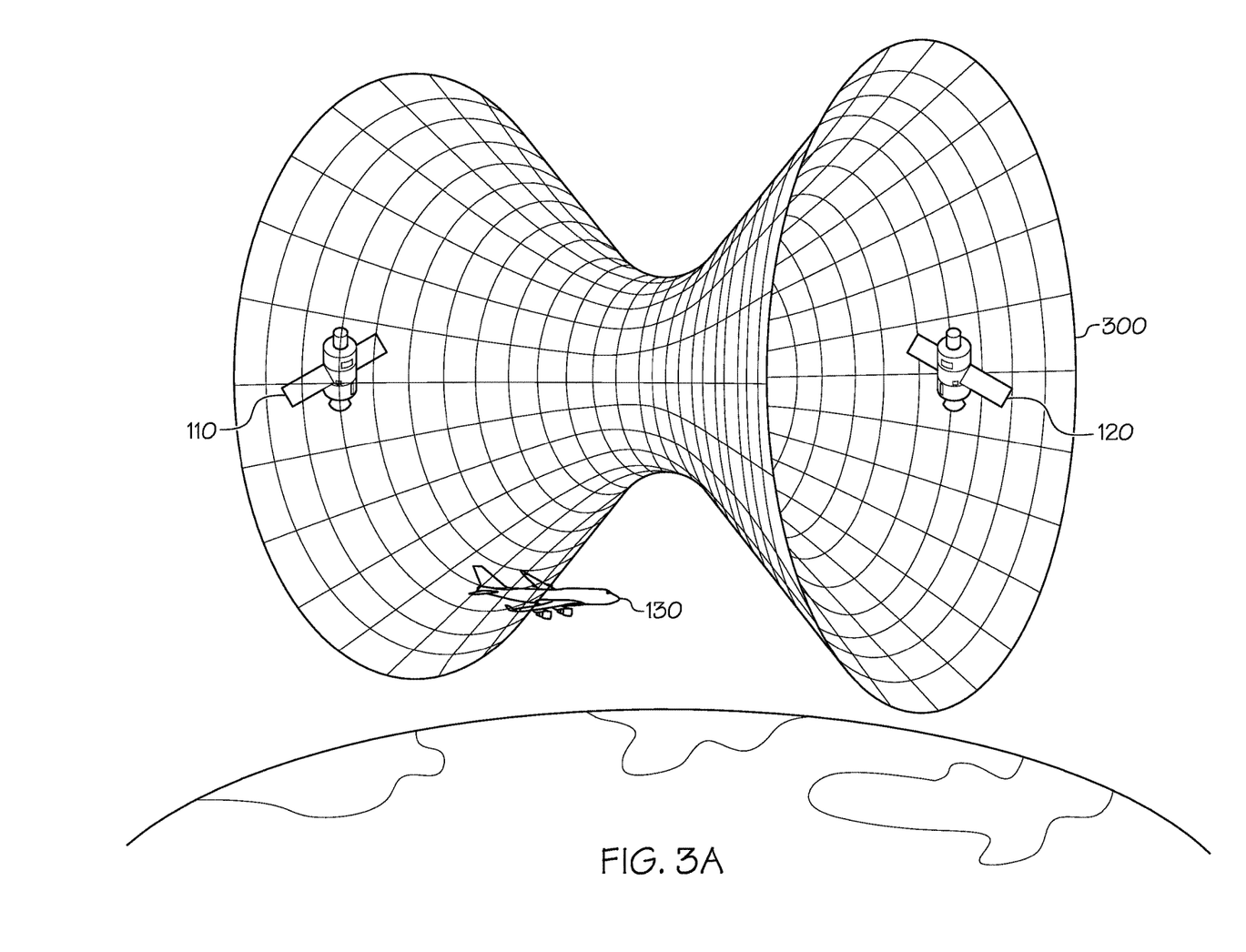
FIG. 3A is an example of a hyperboloid defining potential locations of a transmitter derived by a time difference of arrival technique in accordance with a non-limiting implementation of the present disclosure.
Figure 3B:
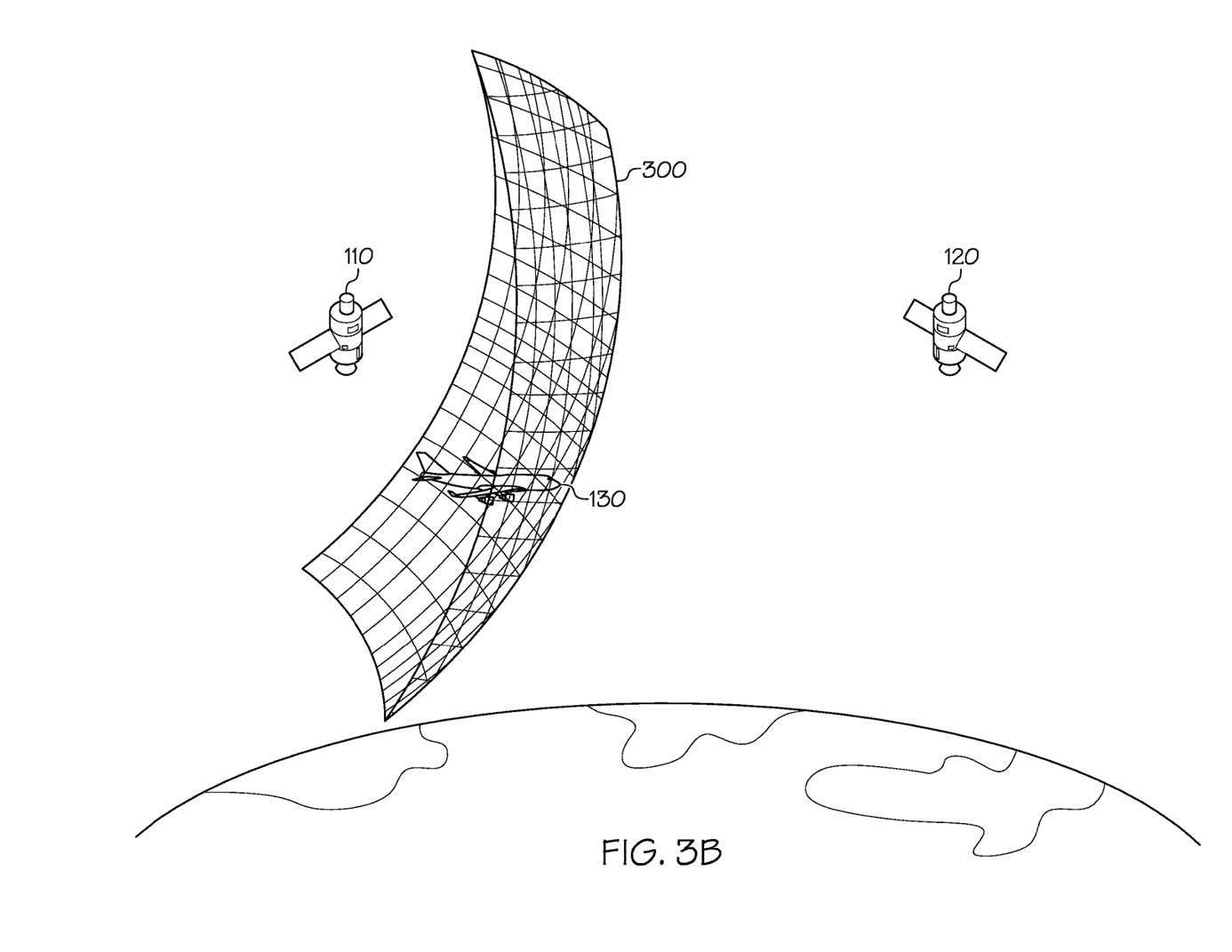
FIG. 3B is another example of defining potential locations of a transmitter derived by a time difference of arrival technique in accordance with a non-limiting implementation of the present disclosure.

FIG. 3A illustrates one non-limiting example of a hyperboloid 300 defining potential positions of aircraft 130 based on the TDOA of the ADS-B message at the receivers on satellites 110 and 120. That is to say, based on the TDOA of the ADS-B message at the receivers on satellites 110 and 120, the actual position of aircraft 130 is estimated as being at any point along the hyperboloid 300. As illustrated in FIG. 3B, the hyperboloid 300 is one side of a two-sheeted hyperboloid. In certain implementations, other data can be used to further narrow the estimated potential positions of aircraft 130. For example, in some implementations, the self-reported altitude of the aircraft 130 included in the ADS-B message can be used to define an ellipsoid around the Earth (e.g., intersecting the self-reported altitude of the aircraft 130) such that the intersection of the hyperboloid 300 and the ellipsoid is a curve that defines potential positions of aircraft 130. A validation distance for the position of the aircraft 130 then can be determined by calculating the distance between the position of the aircraft 130 as reported in the ADS-B message and the point on the curve defined by the intersection of the hyperboloid and the ellipsoid.

In some implementations, as time elapses, multiple validation distances for a particular aircraft based on multiple different ADS-B messages transmitted by the aircraft can be calculated (e.g., according to the techniques described above) and stored for the particular aircraft. In such implementations, this history of stored validation distances (or a portion thereof) preceding the current point in time can be used to validate or invalidate the currently reported position of the aircraft in the current ADS-B message. For example, in certain implementations, a percentage of the validation distances calculated for an aircraft during a defined sliding window in time prior to the current time that are less than or equal to a defined threshold distance is determined. If the percentage is greater than or equal to a defined threshold percentage, the current position of the aircraft as reported in the current ADS-B message may be determined to be valid. Alternatively, if the percentage is less than a defined threshold percentage, the current position of the aircraft as reported in the current ADS-B message may be determined to be invalid.

Additionally or alternatively, in some cases, more than two satellite-based ADS-B receivers may receive the same ADS-B message. According to some implementations, in such cases, the TDOA of the ADS-B message at each unique pair of satellite-based ADS-B receivers that receives the ADS-B message may be used to validate the self-reported position of the aircraft included in the ADS-B message. For example, an estimated position of the aircraft may be determined based on the TDOA of the ADS-B message at each unique pair of ADS-B receivers that receives the message and compared to the self-reported position of the aircraft included in the ADS-B message. In such implementations, the self-reported position of the aircraft may be determined to be valid if some threshold number or percentage of the estimated positions of the aircraft determined based on the TDOA of the ADS-B message at the different unique pairs of ADS-B receivers suggest that the self-reported position of the aircraft is valid. Additionally or alternatively, in implementations in which historical validation data is taken into account in validating the current self-reported position of an aircraft, historical validation data determined by multiple different unique pairs of ADS-B receivers that receive the same ADS-B message during the relevant window in time may be taken into account in validating the current self-reported position of the aircraft.

In some cases, calculating an estimated position of an aircraft based on the TDOA of the same ADS-B message at two or more receivers may be computationally and/or resource intensive. Therefore, in some implementations, instead of calculating an estimated position of an aircraft based on the TDOA of the same ADS-B message at two or more receivers and comparing the estimated position of the aircraft to the position of the aircraft reported in the ADS-B message, TDOA-based validation may be performed by determining the expected TDOA of the ADS-B message at the two or more receivers based on the self-reported position of the aircraft in the ADS-B message (e.g., by accessing a lookup table or other data structure storing expected TDOA data based on the satellite positions and the self-reported aircraft position and/or by calculating the expected TDOA live) and comparing the excepted TDOA to the observed TDOA of the ADS-B message.

A detailed description of one example of an approach for estimating the current position of an aircraft based on the TDOA of an ADS-B message transmitted by the aircraft that is received by two satellites is now provided. While the described approach constructs a hyperboloid based on the TDOA of the ADS-B message at the two satellites and then limits the potential position of the aircraft to the curve defined by the intersection of the hyperboloid and an ellipsoid around the Earth that is defined based on the self-reported altitude of the aircraft, the simpler approach of estimating the current position of the aircraft using only the hyperboloid as described above also will be apparent from the following description.

The general quadratic equation can be represented as:

$$Q(x) = x^T A x + b^T x + c = 0$$

where A is a symmetric N×N matrix, b is an N×1 vector, and c is a scalar. The parameter is x, an N×1 vector. Given a surface or curve defined by $Q(x)=0$ and a point y, the closest point x on the surface must satisfy the condition that y−x is normal to the surface. Since the surface gradient $\nabla Q(x)$ is normal to the surface, the algebraic condition for the closest point can be represented as:

$$y - x = t \nabla Q(x) = t(2Ax + b)$$

for some scalar t. Therefore:

$$x = (I + 2tA)^{-1}(y - tb)$$

where I is the identity matrix. This equation for x could be substituted into the general quadratic equation to solve for t.

To determine potential estimated positions of an aircraft, a quadratic curve that is the result of the intersection between the above-described TDOA-based hyperboloid and the above-described enlarged Earth ellipsoid may be generated. Both of these quadric surfaces can be defined by the generalized equation:

$$(x - v)^T A (x - v) = 1$$

where A is a matrix whose eigenvectors define the principal directions of the surface and whose eigenvalues are the reciprocals of the squares of the semi-axes: $1/a^2$, $1/b^2$, and $1/c^2$. The parameter vector x contains the coordinates in Earth-centered, Earth fixed (ECEF) coordinates and v represents the offset from center of the Earth. For the hyperboloid, this center is the middle point between the two satellites, and, for the Earth ellipsoid, it is zero.

The matrix A can be constructed if both the eigenvalues and eigenvectors are known using:

$$A = RDR^T$$

where D is a matrix of the eigenvalues oriented along the diagonal and R is a matrix whose columns represent each eigenvector. For a two-sheeted hyperboloid like the TDOA-based hyperboloid, there is one positive eigenvalue and there are two negative eigenvalues. For an ellipsoid, to define the Earth, all of the eigenvalues are positive.

The intersection of the surfaces is where both of their equations are equal. Using the generalized equation for both of these quadratic surfaces and the symbol H to represent the matrix of the TDOA-based hyperboloid and E to represent the matrix of the Earth ellipsoid, yields the following equation:

$$(x-v)^T H (x-v) - x^T E x = 0$$

This equation defines a three-dimensional quadratic curve at the intersection of the hyperboloid and ellipsoid.

For E, an oblate spheroid that matches the WGS-84 definition of the Earth's shape may be defined and then enlarged by the altitude of the target. This may serve to ensure that the intersection is in the tangent plane to the target's actual location. This ellipsoid may be defined by:

$$a = 6378137$$
$$e = 8.1819190842622e - 2$$
$$N = \frac{a}{\sqrt{1 - e^2 \sin^2 \phi}}$$
$$a_e = (N + h)$$
$$b_e = N \cdot (1 - e^2) + h$$

where a is the semi-major axis of the Earth ellipsoid, e is the eccentricity of the Earth ellipsoid, N is the prime vertical radius of curvature, φ is the latitude of the target, $a_e$ is the enlarged Earth semi-major axis, and $b_e$ is the enlarged Earth semi-minor axis. These two semi-axes can be used to define the eigenvalues of the enlarged Earth ellipsoid. In the case of the Earth ellipsoid, it already may be oriented in ECEF coordinates such that the eigenvector matrix is the identity matrix which means that E may be defined simply as:

$$E = \begin{bmatrix} \frac{1}{a_e^2} & 0 & 0 \\ 0 & \frac{1}{a_e^2} & 0 \\ 0 & 0 & \frac{1}{b_e^2} \end{bmatrix}$$

For H, the semi-axes may be defined by the relative distance between the two satellites that received the ADS-B message and the TDOA of the ADS-B message at the two satellites. The orientation of the hyperboloid, which provides the eigenvectors and subsequently the matrix R, may be defined by the line between (i) the center point of the two satellites and (ii) one of the satellites, where this line represents the vertical axis of the hyperboloid. The other two axes may be arbitrary because the hyperboloid is symmetric around the vertical axis. The semi-axes may be calculated as:

$$a_h = \frac{c \Delta t}{2}$$

$$b_h = \sqrt{d^2 - a_h^2}$$

where c is the speed of light, Δt is the TDOA of the ADS-B message at the two satellites, and d is the distance between the two satellites. Depending on the implementation, the positions of the satellites and, thus, the distance between the two satellites, may be determined by equipment that determines the instantaneous positions of the satellites in real- or pseudo real-time. Alternatively, in other implementations, the positions of the satellites and the distance between them may be determined based on predetermined orbits of the satellites and/or satellite ephemeris data. Using these semi-axis values and the eigenvectors, the H matrix can be derived:

$$H = R \begin{bmatrix} \frac{1}{a_h^2} & 0 & 0 \\ 0 & -\frac{1}{b_h^2} & 0 \\ 0 & 0 & -\frac{1}{b_h^2} \end{bmatrix} R^T$$

where R is a matrix whose columns are the eigenvectors.

With all of the components of the quadratic curve now defined, the quadratic curve now can be mapped into the generalized form and solved. Recall that the generalized form of the quadratic equation is:

$$Q(x) = x^T A x + b^T x + c = 0$$

Using the equation of the quadratic curve that represents the intersection of the ellipsoid and hyperboloid, each value of the generalized form can be determined:

$$A = H - E$$

$$b = -2v^T H$$

$$c = v^T H v$$

Also recall that the solution for the closest point to a given point on a quadratic curve is provided using the gradient, which gives:

$$x = (I + 2tA)^{-1}(y - tb)$$

Instead of replacing x in the quadratic equation, the problem can be reduced to an easier problem to solve. Because the A matrix is orthonormal, it can be factored using eigen decomposition to obtain $A = RDR^T$. This technique was used earlier to create the matrix defining the hyperboloid. Again, in this case, D is a matrix of the eigenvalues oriented along the diagonal, and R is a matrix whose columns represent each eigenvector. Using this:

$$x = (I + 2tA)^{-1}(y - tb)$$
$$= (RR^T + 2tRDR^T)^{-1}(y - tb)$$
$$= [R(I + 2tD)R^T]^{-1}(y - tb)$$
$$= R(I + 2tD)^{-1}R^T(y - tb)$$
$$= R(I + 2tD)^{-1}(\alpha - t\beta)$$

where $\alpha = R^T y$ and $\beta = R^T b$. This final equation can be used to replace x in the quadratic equation yielding:

$$0 = [R(I + 2tD)^{-1}(\alpha - t\beta)]^T A[R(I + 2tD)^{-1}(\alpha - t\beta)] +$$
$$b^T[R(I + 2tD)^{-1}(\alpha - t\beta)] + c$$
$$= (\alpha - t\beta)^T(I + 2tD)^{-1}R^T RDR^T R(I + 2tD)^{-1}(\alpha - t\beta) +$$
$$b^T R(I + 2tD)^{-1}(\alpha - t\beta) + c$$
$$= (\alpha - t\beta)^T(I + 2tD)^{-1}D(I + 2tD)^{-1}(\alpha - t\beta) +$$
$$\beta^T(I + 2tD)^{-1}(\alpha - t\beta) + c$$

where the inverse diagonal matrix is expanded as:

$$(I + 2tD)^{-1} = \begin{bmatrix} \frac{1}{1 + 2td_1} & 0 & 0 \\ 0 & \frac{1}{1 + 2td_2} & 0 \\ 0 & 0 & \frac{1}{1 + 2td_3} \end{bmatrix}$$

where $d_1$, $d_2$, and $d_3$ are the eigenvalues that made up the eigenvalue matrix D.

Multiplying through by $((1+2td_1)(1+2td_2)(1+2td_3))^2$ in the expanded equation above leads to a polynomial equation of the sixth degree. The roots can be calculated for the polynomial and $x = (I+2tA)^{-1}(y-tb)$ can be calculate for each root. The distances between the calculated x and reported y positions then can be computed and the minimum distance can be found.

In some implementations, a satellite-based ADS-B receiver may be configured to have multiple beams for receiving ADS-B messages, where, for example, one or more of the beams may be overlapping. For example, in some implementations, a satellite-based ADS-B receiver may include a phased-array antenna that provides multiple beams for receiving ADS-B messages. In such implementations where a satellite-based ADS-B receiver is configured to have multiple beams for receiving ADS-B messages, additional or alternative approaches to validating the self-reported position of an aircraft included in an ADS-B message may be performed.

Such so-called "beam-based validation" techniques may be particularly useful in a multi-satellite, space-based ADS-B system in situations in which there is little or no satellite coverage overlap for the location of an aircraft, which makes TDOA-based validation approaches difficult or impossible. For example, in a space-based ADS-B system comprised of a constellation of low-Earth orbit (LEO) satellites arranged in some number of planes of satellites in substantially polar orbits, there may be regions of little or no satellite coverage overlap near the equator.

In certain implementations where a satellite-based ADS-B receiver is configured to have multiple beams for receiving ADS-B messages, when an ADS-B message is received within one beam of the satellite-based receiver, the gain of each beam of the satellite-based receiver with respect to the position of the aircraft reported in the ADS-B message (or with respect to a defined coverage area that includes the position of the aircraft reported in the ADS-B message) may be determined (e.g., based on defined radiation patterns for the receiver and/or corresponding antenna elements) and used to identify the beams of the satellite-based receiver that are expected to receive the ADS-B message and the beams that are not expected to receive the ADS-B message. For example, the beams of the satellite-based receiver that have gains with respect to the position of the aircraft reported in the ADS-B message (or the corresponding defined coverage area) that exceed a defined threshold value may be identified as beams that are expected to receive the ADS-B message. Additionally or alternatively, the beams of the satellite-based receiver that have gains with respect to the position of the aircraft reported in the ADS-B message (or the corresponding defined coverage area) that are less than or equal to a defined threshold value may be identified as beams that are not expected to receive the ADS-B message.

In order to validate (or invalidate) the self-reported position information for the aircraft included in the ADS-B message, the beams of the satellite-based receiver that received the ADS-B message can be compared to the beams that were and/or were not expected to receive the ADS-B message. For example, in some implementations, a validation score may be calculated based on the individual beams of the satellite-based receiver that did or did not receive the ADS-B message relative to the beams of the satellite-based ADS-B receiver that were or were not expected to receive the ADS-B message. For example, the score may be based on one or more of (1) the number of beams of the satellite-based ADS-B receiver expected to receive the ADS-B message that did receive it, (2) the number of beams of the satellite-based ADS-B receiver expected to receive the ADS-B message that did not receive it, (3) the number of beams of the satellite-based ADS-B receiver not expected to receive the ADS-B message that did receive it, and (4) the number of beams of the satellite-based ADS-B receiver not expected to receive the ADS-B message that did receive it. If this validation score exceeds a defined threshold value, the position of the aircraft as reported in the ADS-B message may be determined to be valid.

Depending upon the implementation, the above-described TDOA-based and beam-based validation techniques may be used independently to validate (or invalidate) the position of an aircraft as reported in an ADS-B message and/or they may be used in a complimentary manner to validate (or invalidate) the position of an aircraft as reported in an ADS-B message. In some implementations, TDOA-based validation of the self-reported position of an aircraft may be performed when multiple satellite-based receivers have received the ADS-B message transmitted by the aircraft, and beam-based validation of the self-reported position of the aircraft may be performed when it is determined that only one (or less than some defined number of) satellite-based receivers have received the ADS-B messages transmitted by the aircraft.

Figure 5A:
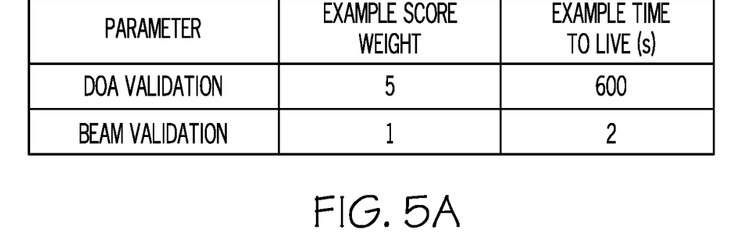
FIG. 5A is a table showing examples of configurable parameters for use in validating self-reported position data in accordance with a non-limiting implementation of the present disclosure.
Figure 5B:
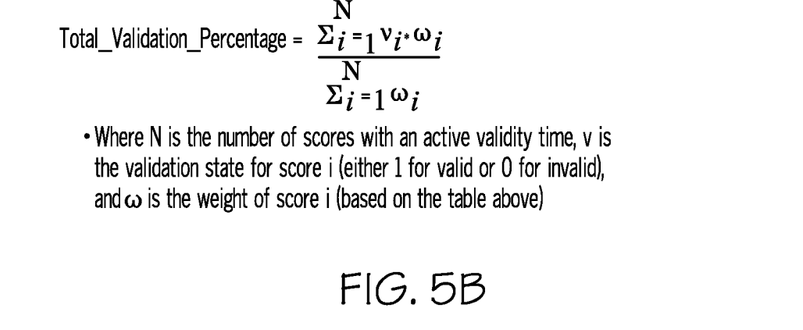
FIG. 5B shows an example of an equation for calculating a total validation percentage score in accordance with a non-limiting implementation of the present disclosure.

For example, one approach for using the above-described TDOA-based and beam-based validation techniques in a complimentary manner is described with reference to FIGS. 5A-B. In this example approach, individual instances of TDOA-based validation results for the position of a particular aircraft during a first defined window of time may be assigned a first weight and individual instances of beam-based validation results for the position of the particular aircraft during a second defined window of time (that may be the same as or different from the first defined window of time) may be assigned a second weight. Then, an overall validation score for the current position of the particular aircraft may be calculated based on the assigned weights and the percentage of valid TDOA-based validation attempts during the first defined window of time and the percentage of valid beam-based validation attempts during the second defined window of time. For example, in one particular implementation, as illustrated in FIG. 5A, TDOA-based validation results for the position of the particular aircraft within a 600-second window of time (e.g., the 600 seconds immediately preceding the time of the self-reported position of the aircraft currently being processed) may be assigned a weight of 5 while beam-based validation attempts for the position of particular aircraft during a 2-second window of time (e.g., the 2 seconds immediately preceding the time of the self-reported position of the aircraft currently being processed) may be assigned a weight of 1. Thereafter, as illustrated in FIG. 5B, a total validation percentage score for the position of the aircraft may be calculated by taking the weighted sum of the valid TDOA-based validation attempts during the 600-second window of time and the valid beam-based validation attempts during the 2-second window of time and dividing by the weighted sum of the total number of TDOA-based validation attempts during the 600-second window of time and the total number of beam-based validation attempts during the 2-second window of time. If the total validation percentage score for the aircraft exceeds a defined threshold value, the current self-reported position of the aircraft may be determined to be valid.

Figure 6:
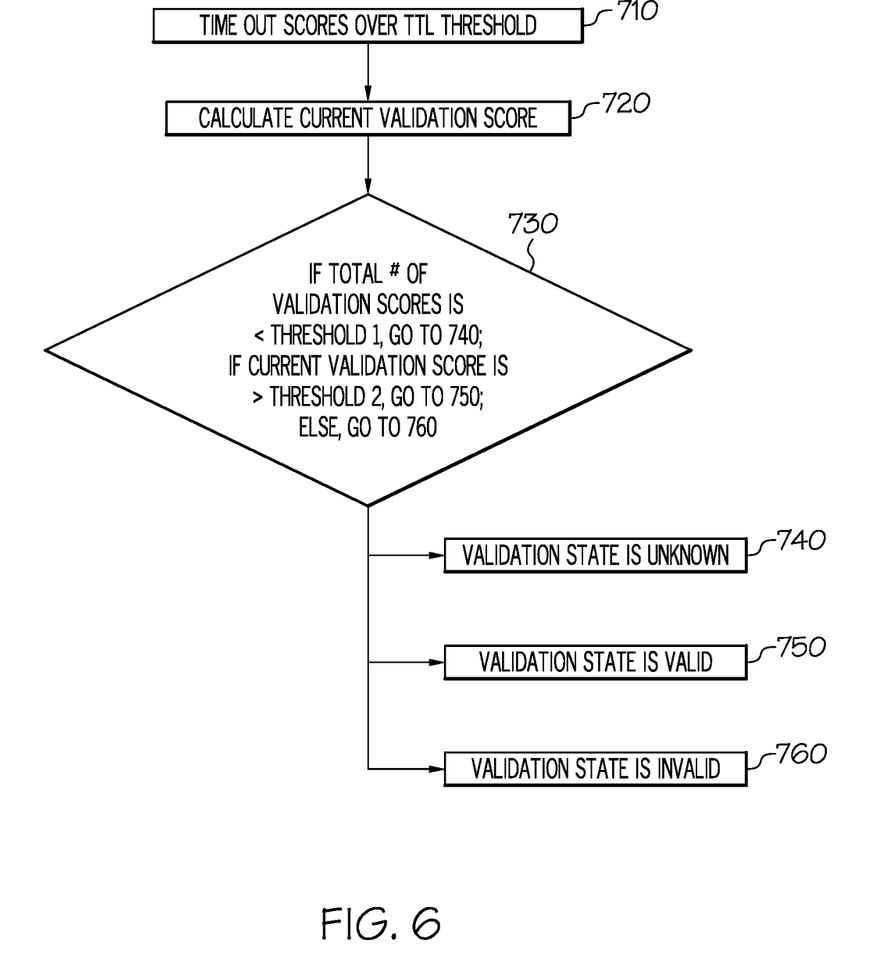
FIG. 6 is a flow chart illustrating an example of a method for validating self-reported position data in accordance with a non-limiting implementation of the present disclosure.

FIG. 6 is a flow chart 700 of one example of a method for determining a current validation state for the self-reported position of an aircraft included in an ADS-B message. At step 710, all validation scores for the self-reported position of the aircraft that have exceeded their defined time-to-live are discarded. A time-to-live may be defined such that only those prior validation scores for the self-reported position of the aircraft that are within some defined period of the current time are taken into account in determining the current validation state for the self-reported position of the aircraft. At step 720, the validation score for the current self-reported position of the aircraft is determined based on the remaining validation scores for the self-reported position of the aircraft. For example, in some implementations, the validation score can be calculated based on the equation depicted in FIG. 5B. In alternative implementations, the validation score may be calculated based, at least in part, on TDOA-based validation scores without beam-based validation scores. Likewise, in some other alternative implementations, the validation score may be calculated based, at least in part, on beam-based validation scores without TDOA-based validation scores. At step 730, if the total number of validation scores for the self-reported position of the aircraft currently under consideration is less than a first defined threshold, then the validation state for the self-reported position of the aircraft is set to unknown at step 740, for example, signifying that there may not be enough self-reported position data for the aircraft to determine if the current self-reported position of the aircraft is valid (e.g., because the aircraft just took off or no ADS-B messages have been received from the aircraft for an extended period of time). Alternatively, if the total number of validation scores for the self-reported position of the aircraft currently under consideration is greater than or equal to the first defined threshold and the validation score for the current self-reported position of the aircraft is greater than a second defined threshold, then the validation state for the self-reported position of the aircraft is set to valid at step 750. Otherwise, if the total number of validation scores for the self-reported position of the aircraft currently under consideration is greater than or equal to the first defined threshold but the validation score for the current self-reported position of the aircraft is less than or equal to the second defined threshold, then the validation state for the self-reported position of the aircraft is set to invalid at step 760.

Figure 4:
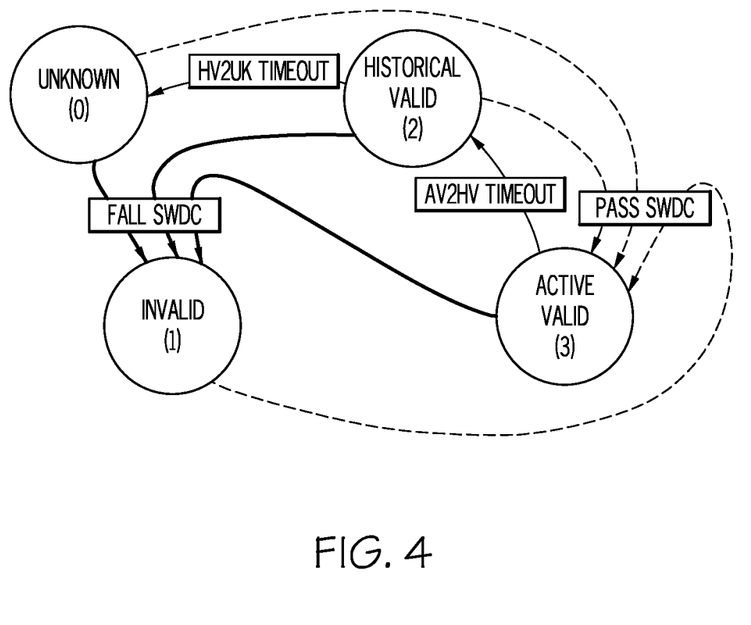
FIG. 4 is a block diagram of an example of a state machine for determining and updating the validity of self-reported position data in accordance with a non-limiting implementation of the present disclosure.

In some implementations, the validation state for the self-reported position of an aircraft may be determined and updated using a state machine. FIG. 4 is a block diagram of one example of a state machine for determining and updating the validation state for the self-reported position of an aircraft. As illustrated in FIG. 4, in some implementations, the validation state for the self-reported position of an aircraft may be in one of four different states:

Unknown—Signifying, for example, that the current self-reported position of the aircraft cannot or has not been validated. When the validation state for the self-reported position of an aircraft is first starting to be tracked, the validation state may start in the Unknown state until enough validation scores have been calculated to determine if the self-reported position of the aircraft is valid or invalid.

Invalid—Signifying that the self-reported position of the aircraft has been determined to be invalid, for example, because, as illustrated in the example of FIG. 4, the self-reported position of the aircraft failed a sliding window distance check (SWDC) because the percentage of times that the distance between the self-reported position of the aircraft and the estimated position of the aircraft exceeded a defined threshold distance during the sliding window in time exceeded a defined threshold percentage.

Active Valid—Signifying that the self-reported position of the aircraft has been determined to be valid, for example, because, as illustrated in the example of FIG. 4, the self-reported position of the aircraft passed the SWDC because the percentage of times that the distance between the self-reported position of the aircraft and the estimated position of the aircraft was less than a defined threshold distance during the sliding window in time exceeded a defined threshold percentage.

Historical Valid—Signifying, for example, that the validation state for the self-reported position of the aircraft was most recently determined to be valid but more than some defined period of time has elapsed since the most recent validation check was performed (e.g., because the aircraft is currently located in an area where there is little or no satellite coverage area overlap and TDOA-based validation checks cannot be performed). As illustrated in FIG. 4, if a defined period of time elapses while the validation state for the self-reported position of the aircraft remains Historical Valid, the validation state for the self-reported position of the aircraft may transition back to the Unknown state.

Figure 2:
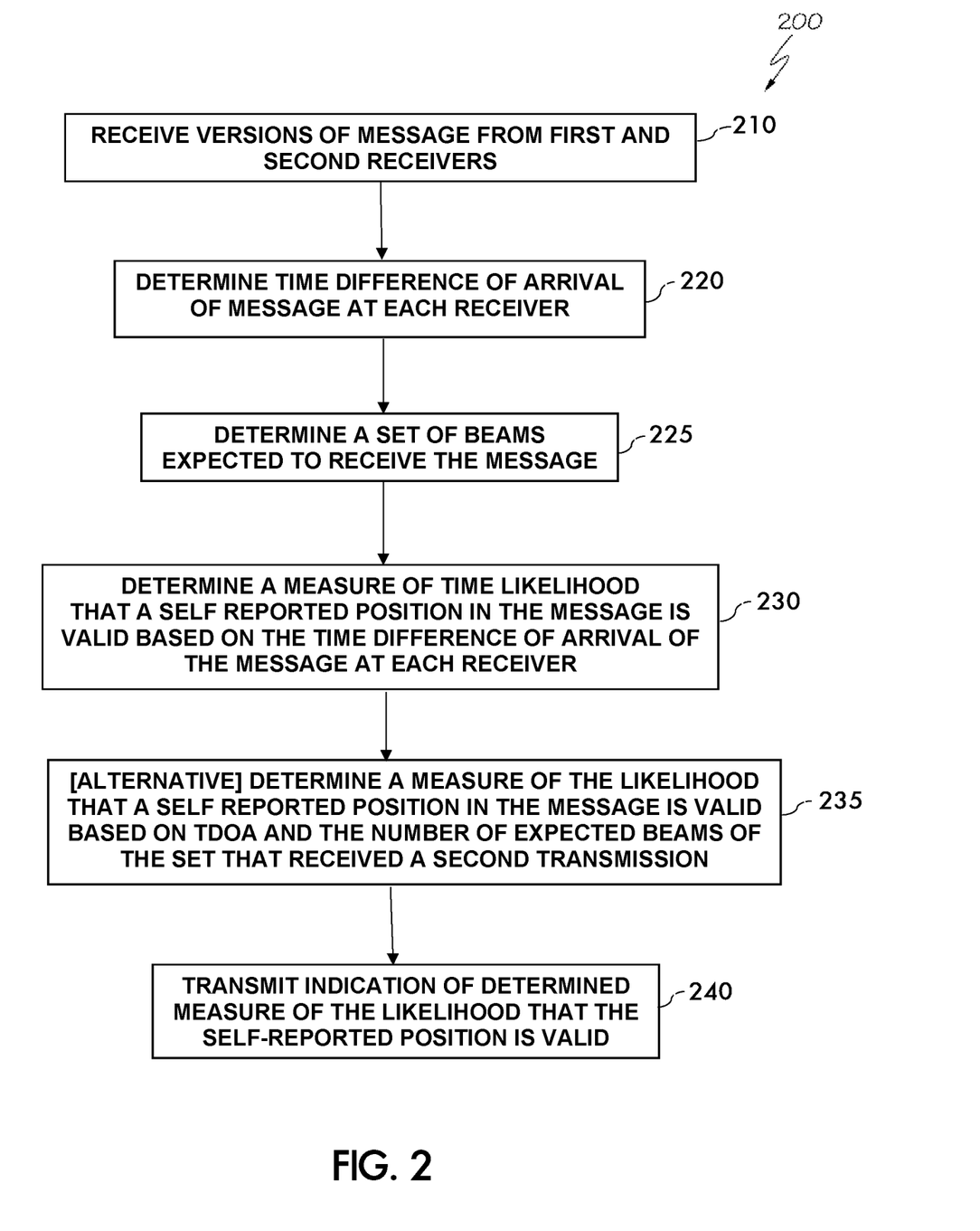
FIG. 2 is a flowchart illustrating an example of a method for self-reported position validation in accordance with a non-limiting implementation of the present disclosure.

Referring now to FIG. 2, a flowchart illustrating an example of a TDOA-based method for validating the self-reported position of an aircraft included in an ADS-B message received by two or more satellite-based receivers is shown in accordance with a non-limiting implementation of the present disclosure. At step 210, versions of (or data about) an ADS-B message received by both a first satellite-based receiver and a second satellite-based receiver are received. The ADS-B message includes a self-reported position of the aircraft that transmitted the ADS-B message. In some implementations, the versions of (or data about) the ADS-B message may be forwarded by the satellite-based receivers to a terrestrially based central processing system that receives them. Additionally or alternatively, the versions of (or data about) the ADS-B message may be received by a processing system that resides on one or more satellites, base stations, or other linked nodes in a satellite network or external to the network. In some implementations, the current distance between the two satellite-based receivers may be determined, and, if the distance is less than a defined threshold distance (e.g., 500 nautical miles), the self-reported position of the aircraft may not be validated based on the TDOA of the ADS-B message at the two satellite-based ADS-B receivers. At step 220, the TDOA of the message at each receiver is determined. In certain implementations, the message may include a transmit time. When the message is received, it may be stamped or otherwise marked with a receipt time. In such implementations, the differences in these times may be used to determine the TDOA of the message at the two receivers. In certain implementations, a hyperboloid may be generated that defines possible positions of the transmitter based on the TDOA of the message at the two receivers. At step 225, a set of beams expected to receive the message is determined.

At step 230, a measure of the likelihood that the self-reported position of the aircraft included in the message is determined based on the TDOA of the message at the two receivers. In certain implementations, self-reported altitude data included in the message may be used to define an ellipsoid around the Earth at the self-reported altitude. In such implementations, the curve defined by the intersection of the hyperboloid and the ellipsoid may be considered to define possible estimated locations for the transmitter, and the distance between the self-reported position of the transmitter and the closest point on the curve to the self-reported position may be calculated. If that distance is less than a defined threshold distance, it may be determined that the self-reported position of the transmitter is likely to be valid. Alternatively, if that distance is greater than or equal to a defined threshold distance, it may be determined that the self-reported position of the transmitter is likely to be invalid. In alternative implementations, the distance between the self-reported position of the transmitter and the closest point on the hyperboloid to the self-reported position may be determined. If that distance is less than a defined threshold distance, it may be determined that the self-reported position of the transmitter is likely to be valid. Alternatively, if that distance is greater than or equal to a defined threshold distance, it may be determined that the self-reported position of the transmitter is likely to be invalid. In an alternative embodiment, at step 235 a measure of the likelihood that a self-reported position in the message is valid based upon TDOA and the number of expected beams of the set that received a second transmission is determined.

At step 240, the determined measure of the likelihood that the self-reported position is valid is transmitted. Additionally or alternatively, the determined measure of the likelihood that the self-reported position is valid also may be stored locally, for example, for later use. In some implementations, the determined measure of the likelihood that the self-reported position is valid may be transmitted to an air traffic control system, for example, for use by air traffic controllers. In some implementations, in addition to transmitting the determined measure of the likelihood that the self-reported position is valid, the self-reported position of the transmitter and/or the estimated position of the transmitter (e.g., the closest point on the curve defined by the intersection of the hyperboloid and the ellipsoid to the self-reported position of the transmitter or the closest point on the hyperboloid to the self-reported position of the transmitter) also may be transmitted. In implementations where the measure of the likelihood that the self-reported position is valid, the self-reported position of the transmitter, and the estimated position of the transmitter all are transmitted (e.g., to an air traffic control system), the self-reported position of the transmitter may be displayed concurrently with the measure of the likelihood that the self-reported position is valid and the estimated position of the transmitter.

Aspects of the present disclosure may be implemented entirely in hardware, entirely in software (including firmware, resident software, micro-code, etc.) or in combinations of software and hardware that may all generally be referred to herein as a "circuit," "module," "component," or "system." Furthermore, aspects of the present disclosure may take the form of a computer program product embodied in one or more machine-readable media having machine-readable program code embodied thereon.

Any combination of one or more machine-readable media may be utilized. The machine-readable media may be a machine-readable signal medium or a machine-readable storage medium. A machine-readable storage medium may be, for example, but not limited to, an electronic, magnetic, optical, electromagnetic, or semiconductor system, apparatus, or device, or any suitable combination of the foregoing. More specific examples (a non-exhaustive list) of such a machine-readable storage medium include the following: a hard disk, a random access memory (RAM), a read-only memory (ROM), an erasable programmable read-only memory (EPROM or Flash memory), an appropriate optical fiber with a repeater, an optical storage device, a magnetic storage device, or any suitable combination of the foregoing. In the context of this document, a machine-readable storage medium may be any tangible medium that can contain, or store a program for use by or in connection with an instruction execution system, apparatus, or device, such as, for example, a microprocessor.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device. Program code embodied on a machine-readable signal medium may be transmitted using any appropriate medium, including but not limited to wireless, wireline, optical fiber cable, RF signals, etc., or any suitable combination of the foregoing.

Computer program code for carrying out operations for aspects of the present disclosure may be written in any combination of one or more programming languages, including object oriented programming languages, dynamic programming languages, and/or procedural programming languages.

The flowchart and block diagrams in the figures illustrate examples of the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order illustrated in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and machine-readable instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Furthermore, while the position validation techniques described herein generally were disclosed in the context of validating self-reported position information included in ADS-B messages received by space-based ADS-B receivers, the position validation techniques also may be applicable to and may be used by terrestrial ADS-B receivers to validation self-reported position information. Moreover, the position validation techniques described herein are not limited to validating self-reported position information included in ADS-B messages and may be used to validation position information in other contexts as well. The aspects of the disclosure herein were chosen and described in order to explain the principles of the disclosure and the practical application, and to enable others of ordinary skill in the art to understand the disclosure with various modifications as are suited to the particular use contemplated.

What is claimed is:

1. A method comprising:
   receiving, at a central processing system, versions of a message from a first satellite-based receiver and a second satellite-based receiver that both received a radio frequency ("RF") transmission of the message, the message comprising a self-reported position of a transmitter of the message;
   wherein the respective versions of the message from the first satellite-based receiver and the second satellite-based receiver include a first arrival time of the RF transmission of the message at the first satellite-based receiver and a second arrival time of the RF transmission of the message at the second satellite-based receiver;
   determining, at the central processing system, a time difference between the first arrival time of the RF transmission of the message at the first satellite-based receiver and the second arrival time of the RF transmission of the message at the second satellite-based receiver;

determining, at the central processing system, a measure of the likelihood that the self-reported position of the transmitter is valid based on the time difference between the first and second arrival times and an expected time difference between the first and second arrival times based upon respective positions of the first and second satellite-based receivers and the self-reported position; and transmitting, to an aircraft surveillance system, the self-reported position and an indication of the measure of the likelihood that the self-reported position is valid for use in air traffic control.

2. The method of claim 1, wherein the respective versions of the message include information regarding the respective positions of the first satellite-based receiver and the second satellite-based receiver and wherein determining the measure of the likelihood comprises:

determining a three dimensional surface comprising potential positions of the transmitter based on the time difference between the first and second arrival times.

3. The method of claim 2, wherein determining the measure of the likelihood further comprises:

determining a distance between the self-reported position and a point on the surface that is closest to the self-reported position; and determining if the distance is within a defined range.

4. The method of claim 2, wherein determining the measure of the likelihood further comprises:

determining an other three-dimensional surface based on an altitude component of the self-reported position; and determining a curve defined by an intersection of the three-dimensional surface and the other three-dimensional surface, the curve comprising potential positions of the transmitter.

5. The method of claim 4, wherein determining the measure of the likelihood further comprises:

determining a distance between the self-reported position and a point on the curve that is closest to the self-reported position; and determining if the distance is within a defined range.

6. The method of claim 2, wherein the three dimensional surface is a hyperboloid.

7. The method of claim 1, wherein the transmitter is hosted on an in-flight aircraft, and wherein the time difference is determined by comparing the first arrival time and the second arrival time received in the first message.

8. The method of claim 7, wherein the message is an automatic dependent surveillance-broadcast ("ADS-B") message transmitted by the transmitter on the aircraft.

9. The method of claim 1, wherein determining the measure of the likelihood comprises:

determining a three dimensional surface comprising potential positions of the transmitter based on:
the time difference between the first and second arrival times, and
respective positions of the first and second satellite-based receivers.

10. The method of claim 9, wherein the locations of the first and second satellite-based receivers are defined according to predetermined orbits of the first and second satellite-based receivers.

11. The method of claim 1, wherein determining a measure of the likelihood that the self-reported position of the transmitter is valid based on the time difference between the first and second arrival times comprises:

determining an expected time difference between the first and second arrival times based on positions of the first and second satellite-based receivers and the self-reported position; and comparing the time difference between the first and second arrival times to the expected time difference between the first and second arrival times.

12. A method comprising:

receiving versions of a first message from a first satellite-based receiver and a second satellite-based receiver that both received a radio frequency ("RF") transmission of the message, the message comprising a first self-reported position of a transmitter of the message;

wherein the respective versions of the first message from the first satellite-based receiver and the second satellite-based receiver include a first arrival time of the RF transmission of the message at the first satellite-based receiver and a second arrival time of the RF transmission of the message at the second satellite-based receiver;

determining a time difference between the first arrival time of the RF transmission of the first message at the first satellite-based receiver and the second arrival time of the RF transmission of the first message at the second satellite-based receiver;

receiving a second message from the first satellite-based receiver, the second message comprising a second self-reported position of the transmitter, wherein an RF transmission of the second message is received on a first beam of the first satellite-based receiver;

wherein the first satellite-based receiver comprises an antenna array forming multiple beams of the first satellite-based receiver;

determining a set of beams of the first satellite-based receiver expected to receive the RF transmission of the second message based on measuring the respective gain of each of the multiple beams of the first satellite-based receiver with respect to the second self-reported position of the transmitter, and comparing the respective gain of each of the multiple beams to a respective threshold value;

determining a number of the beams of the set that received the RF transmission of the second message;

determining a measure of the likelihood that the self-reported positions of the transmitter are valid based on (i) the time difference between the first and second arrival times and (ii) number of the beams of the set that received the RF transmission of the second message; and transmitting, to an aircraft surveillance system, the self-reported position and an indication of the likelihood that the self-reported positions are valid, for use in air traffic control.

13. The method of claim 12, wherein determining a set of beams of the first satellite-based receiver is performed in response to determining that the transmitter is outside of a coverage area, for the second message, associated with the second satellite-based receiver.

14. The method of claim 12, wherein the transmitter is hosted on an in-flight aircraft.

15. The method of claim 14, wherein the message is an automatic dependent surveillance-broadcast ("ADS-B") message transmitted by the transmitter on the aircraft.

16. The method of claim 12, wherein the indication of the measure of the likelihood that the self-reported position of the transmitter is valid is determined based on a state machine that is updated after the message is received.

17. The method of claim 13, wherein the transmitter is hosted on an aircraft and transmits automatic dependent surveillance-broadcast ("ADS-B") messages.

18. The method of claim 12, wherein the satellite-based receiver is hosted on a satellite that is part of a satellite constellation, wherein the transmitter is out of range of other satellites in the satellite constellation, and wherein the measure of the likelihood that the self-reported position of the transmitter is valid is used to validate self-reported position data transmitted by the transmitter after previous self-reported position data was validated using time difference of arrival ("TDOA") based on differences in times of arrival of RF transmissions transmitted by the transmitter at two or more satellites of the satellite constellation.

19. The method of claim 12, wherein determining a set of beams of the first satellite-based receiver is performed in response to determining that the transmitter is outside of a coverage area, associated with the second satellite-based receiver.

20. The method of claim 15, wherein determining a set of beams of the first satellite-based receiver is performed in response to determining that the transmitter is outside of a coverage area, for the second message, associated with the second satellite-based receiver.

* * * * *